(12) United States Patent
O'Brien et al.

(10) Patent No.: US 8,338,987 B2
(45) Date of Patent: Dec. 25, 2012

(54) POWER GENERATION FREQUENCY CONTROL

(75) Inventors: Kathleen Ann O'Brien, Niskayuna, NY (US); Robert William Delmerico, Clifton Park, NY (US); Owen Jannis Samuel Schelenz, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 280 days.

(21) Appl. No.: 12/713,717

(22) Filed: Feb. 26, 2010

(65) Prior Publication Data
US 2011/0210613 A1    Sep. 1, 2011

(51) Int. Cl.
*H02J 1/00* (2006.01)
(52) U.S. Cl. .............................. 307/82; 307/73; 136/244
(58) Field of Classification Search .................... 307/43, 307/82, 73; 136/244
See application file for complete search history.

(56) References Cited

U.S. PATENT DOCUMENTS

| | | | |
|---|---|---|---|
| 4,375,662 A | 3/1983 | Baker | |
| 6,285,572 B1 | 9/2001 | Onizuka et al. | |
| 6,930,868 B2 * | 8/2005 | Kondo et al. | 361/42 |
| 6,966,184 B2 | 11/2005 | Toyomura et al. | |
| 7,193,872 B2 * | 3/2007 | Siri | 363/95 |
| 7,345,373 B2 | 3/2008 | Delmerico et al. | |
| 7,994,768 B2 * | 8/2011 | Park | 323/283 |
| 8,013,472 B2 * | 9/2011 | Adest et al. | 307/77 |
| 2005/0254191 A1 * | 11/2005 | Bashaw et al. | 361/62 |
| 2008/0238195 A1 * | 10/2008 | Shaver et al. | 307/18 |
| 2009/0086520 A1 * | 4/2009 | Nishimura | 363/133 |
| 2009/0091956 A1 | 4/2009 | Nocentini et al. | |
| 2009/0194995 A1 | 8/2009 | Delmerico et al. | |
| 2009/0295227 A1 * | 12/2009 | Chang et al. | 307/46 |
| 2010/0138063 A1 * | 6/2010 | Cardinal et al. | 700/291 |

FOREIGN PATENT DOCUMENTS
WO    2008149393 A1    12/2008

OTHER PUBLICATIONS

Y. Beck, "A Photovoltaic Grid Connected Inverter with Current Source Characteristics and Maximum Power Tracking," International Aegean Conference Sep. 10-12, 2007, downloaded IEEE, ISBN: 978-1-4244-0890-0, pp. 1-4.
K. A. O'Brien et al., "Solar Power Generation Stabilization System and Method," U.S. Appl. No. 12/565,004, filed Sep. 23, 2009.
K. A. O'Brien et al., "Solar Inverter and Control Method," U.S. Appl. No. 12/473,700, filed May 28, 2009.

* cited by examiner

*Primary Examiner* — Jared Fureman
*Assistant Examiner* — Alfonso Perez Borroto
(74) *Attorney, Agent, or Firm* — Seema Katragadda

(57) ABSTRACT

A solar power generation system includes a control system and a DC to AC converter coupled to a photovoltaic (PV) module and for supplying power to a power network. The control system includes a power point tracker to extract either maximum power available from the PV module or less than maximum power available from the PV module, a frequency monitor to obtain a network frequency from the power network, an internal reference frame element to provide an internal reference frequency of the solar power generation system, a frequency comparator to compare the network frequency and the internal reference frequency, and a command signal generator to use the frequency comparison to determine whether a transient increase or decrease in commanded output power is warranted and to provide a command signal.

19 Claims, 3 Drawing Sheets

POWER GENERATION FREQUENCY CONTROL

BACKGROUND

The subject matter disclosed herein relates generally to solar power generation systems and more particularly to frequency control of solar power generation systems.

Traditional power generation equipment (such as synchronous generators) naturally responds to frequency disturbances due to the grid coupled rotating inertia and governor controls of such equipment. Solar power generation equipment presently does not have the frequency-regulating capability of synchronous generators.

Solar power generation systems have photovoltaic (PV) modules, which produce electrical power. In order to feed the electrical power to the grid, power electronic elements are used for power conditioning. In one example, the power electronic elements include a direct current (DC) to DC converter and a DC to alternating current (AC) inverter connected back to back through a DC link.

As new grid codes are developed for solar power generation systems, and as market penetration level of solar power increases, variability of solar power is becoming less acceptable to utility companies. For example, utility companies are imposing or expected to impose requirements related to power ramp rate limits, curtailment, and frequency stabilization.

Frequency stabilization relates to stabilizing the grid frequency. It is a well-known characteristic of utility systems that the grid frequency tends to decrease when the load exceeds the generation and to increase when the generation exceeds the load. Such decreases or increases may occur in a monotonic manner, an oscillating manner, or combinations thereof when the grid is subjected to a sudden change in the balance between generation and load. It is a consideration in the design of such a system that any method to achieve compensation of such decreases or increases should be one that does not result into aggravating the grid oscillations.

It would be desirable to enable solar power generation systems to provide frequency stabilization capability in order to increase the stability and reliability of the power grid to which the system is coupled.

BRIEF DESCRIPTION

Briefly, in accordance with one embodiment of the present invention, a solar power generation system comprises: a DC to AC converter coupled to a photovoltaic (PV) module and for supplying power to a power network; and a control system comprising a power point tracker to extract either maximum power available from the PV module or less than maximum power available from the PV module, a frequency monitor to obtain a network frequency from the power network, an internal reference frame element to provide an internal reference frequency of the solar power generation system, a frequency comparator to compare the network frequency and the internal reference frequency, and a command signal generator to use the frequency comparison to determine whether a transient increase or decrease in commanded output power is warranted and to provide a command signal.

In accordance with another embodiment of the present invention, a solar power generation system comprises: a DC to AC converter for receiving power from a PV module and supplying power to a power network, wherein the DC to AC converter is coupled to the power network along a power line; an energy storage unit coupled to the power line through an additional power converter for supplying or absorbing energy when needed to support frequency stabilization of the power network; and a control system. The control system comprises a power point tracker to extract either maximum power available from the PV module or less than maximum power available from the PV module; a frequency monitor to obtain a network frequency from the power network; an internal reference frame element to provide an internal reference frequency of the solar power generation system; a frequency comparator to compare the network frequency and the internal reference frequency; and a command signal generator (30) to provide a command signal to adjust the commanded output power, the supply or absorption of energy by the energy storage unit, or both when the network frequency differs from the internal reference frequency by a comparison limit.

In accordance with another embodiment of the present invention, a method is provided for operating a solar power generation system comprising a photovoltaic (PV) module and a DC to AC converter coupled to the PV module for supplying power to a power network. The method comprises: using a power point tracker element to extract either maximum power available from the PV module or less than maximum power available from the PV module; obtaining a network frequency from the power network; providing an internal reference frequency of the solar power generation system; comparing the network frequency and the internal reference frequency; and using the frequency comparison to determine whether a transient increase or decrease in commanded output power is warranted and to provide a command signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of skill in the art to which this invention belongs. The terms "first", "second," "another," and the like, as used herein do not denote any order, quantity, or importance, but rather are used to distinguish one element from another. The terms "a" and "an" do not denote a limitation of quantity, but rather denote the presence of at least one of the referenced item. Also, two elements being "coupled" does not denote a limitation of direct coupling and may include coupling through additional elements. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

Figure 1:
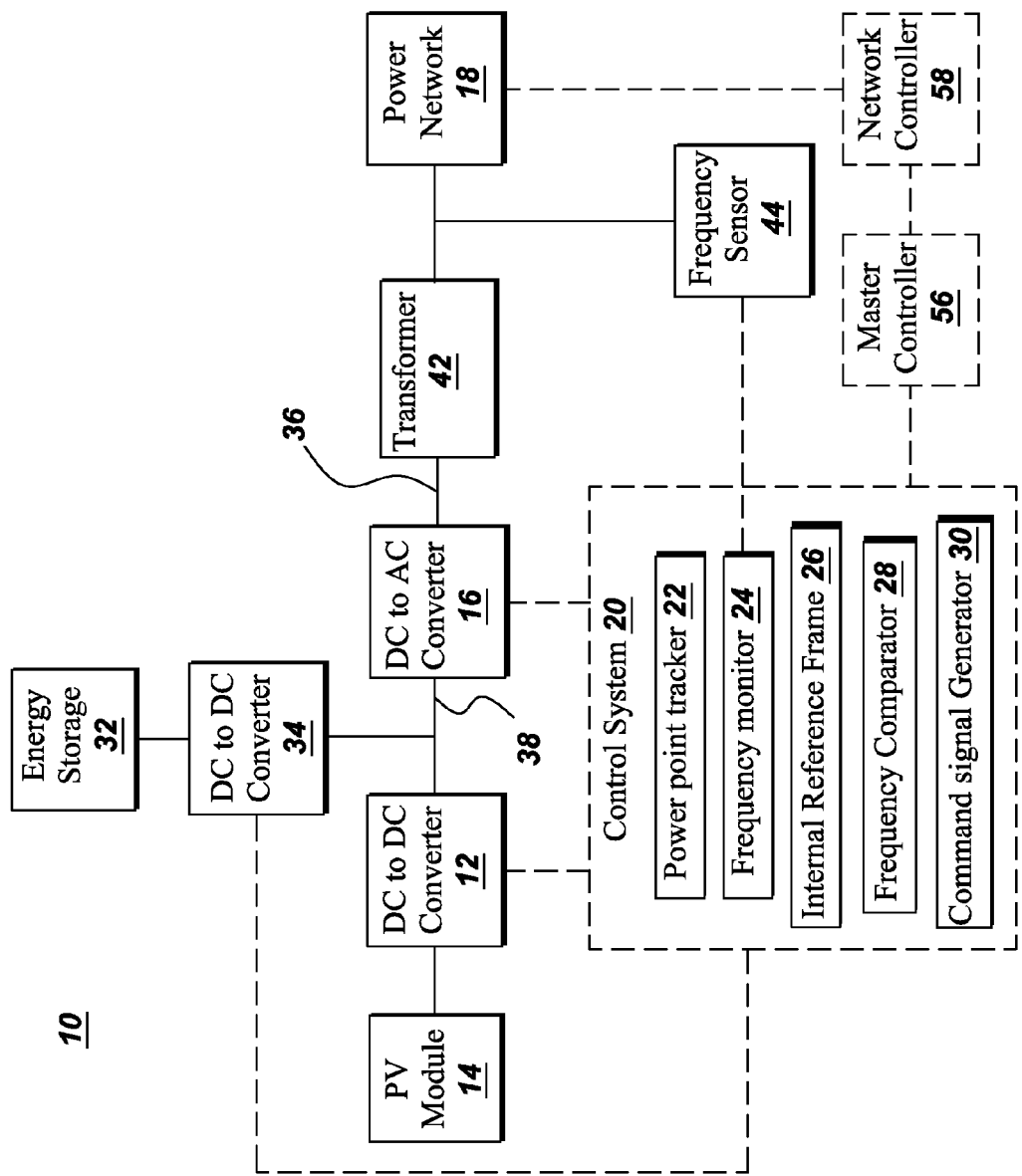
FIG. 1 is a block diagram of a solar power generation system including an energy storage unit associated with an individual photovoltaic module in accordance with one embodiment.

Referring to FIG. 1, in one embodiment, a solar power generation system 10 comprises: a DC to DC converter 12 for receiving power from a photovoltaic (PV) module 14, a DC to AC converter 16 coupled to DC to DC converter 12 and for supplying power to a power network 18, and a control system 20. Control system 20 may comprise: a power point tracker 22 to control at least one of the DC to DC and DC to AC converters 12 and 16 and to extract either maximum power available from PV module 14 or less than maximum power available from PV module 14, a frequency monitor 24 to obtain a network frequency from power network 18, an internal reference frame element 26 to provide an internal reference frequency of solar power generation system 10, a frequency comparator 28 to compare the network frequency and the internal reference frequency, and a command signal generator 30 to use the frequency comparison to determine whether a transient increase or decrease in commanded output power is warranted and/or whether obtaining power from or sending power to an energy storage unit 32 is warranted. The command generator uses the determination to provide a command signal.

Figure 2:
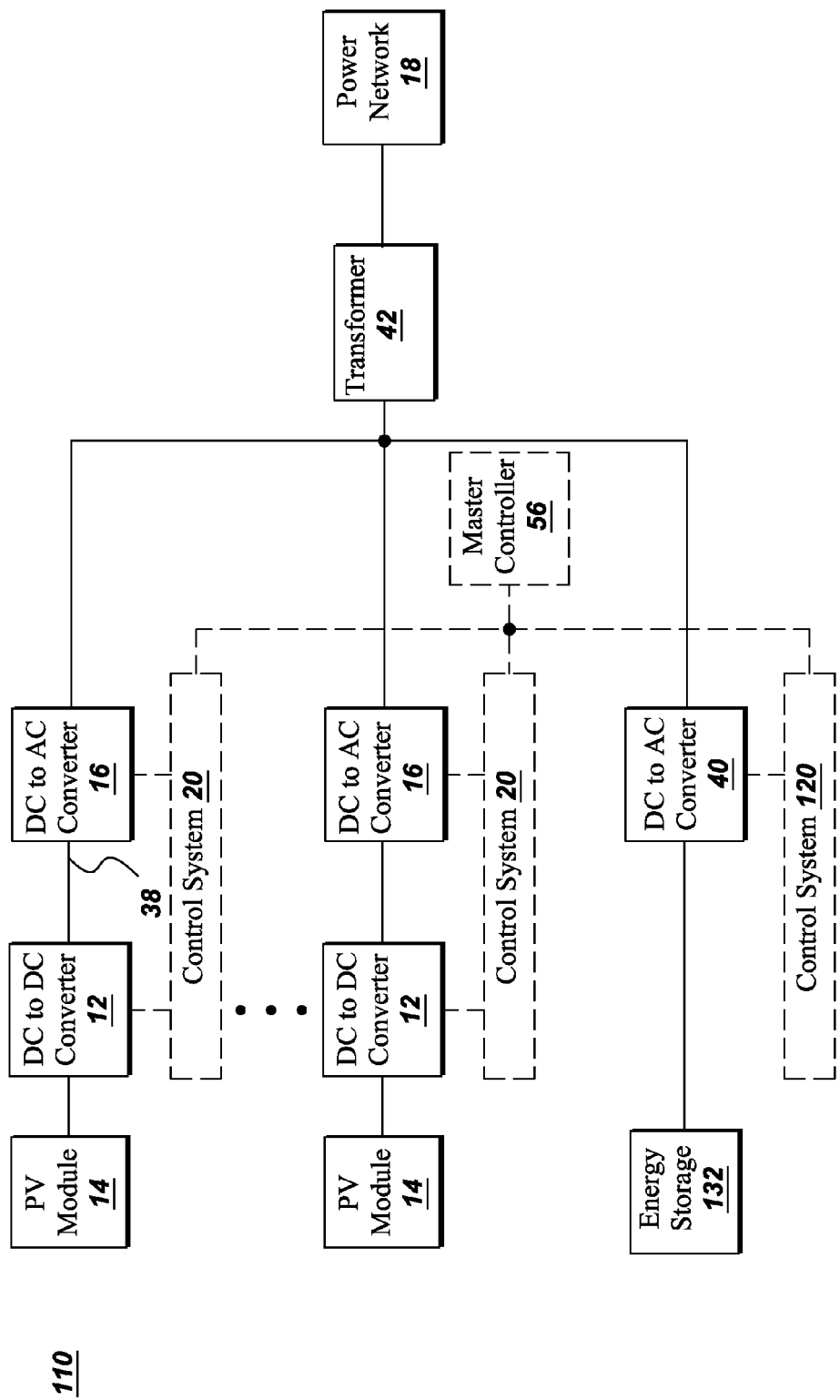
FIG. 2 is a block diagram of a solar power generation system including a centralized energy storage unit associated with a plurality of photovoltaic modules in accordance with another embodiment.

PV module 14 typically comprises a plurality of photovoltaic cells and may comprise a single PV module or an array or string of a plurality of PV modules. Although DC to DC converter 12 is shown for purposes of example, DC to DC converter 12 is not required and in some single stage embodiments will be omitted. When included, DC to DC converter 12 is controlled so as to maintain a constant DC voltage at a DC link 38, and DC to AC converter 16 is coupled to DC to DC converter 12 by DC link 38. DC to AC converter 16 may comprise either a three phase converter or multiple single phase converters, for example. DC to DC converter 12 and DC to AC converter 16 are coupled to each other and the power network along a power line 36 comprising the lines, cables, or other connectors that couple the various power elements and ultimately couples PV module 14 to power network 18. For example, DC to AC converter 16 is typically coupled to power network 18 through a power transformer 42. Transformer 42 typically comprises a step up transformer that may be shared by a plurality of DC to AC converters 16 (such as shown in FIG. 2, for example). Power network 18 may comprise a utility grid or any other system of connecting generators and loads, for example.

Frequency monitor 24 may obtain the network frequency using any appropriate direct or indirect detection technology. In one embodiment, frequency monitor 24 comprises or obtains data from a frequency sensor 44 situated on a portion of power line 36 coupled directly to the power network. In other embodiments, a frequency sensor may instead be situated along power line 36 at a location closer to PV module 14, such as between DC to AC converter 16 and transformer 42, for example, with some additional calculations being used in such embodiments to estimate the value at power network 18 using the value at that earlier location on power line 36.

Figure 3:
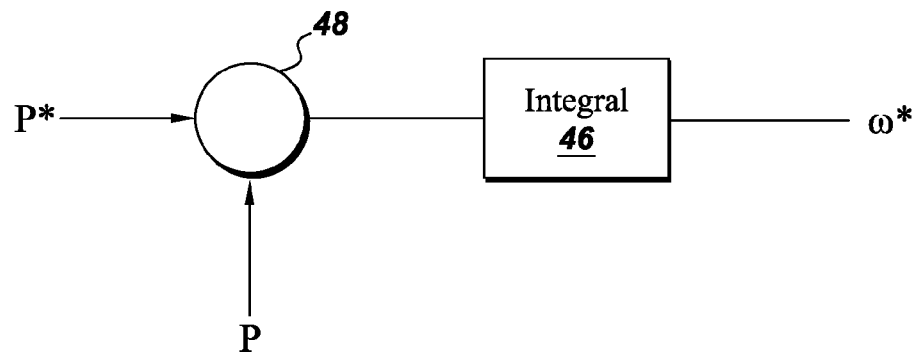
FIGS. 3 and 4 are block diagrams of embodiments of internal reference frame elements for use in the embodiments of FIGS. 1 and 2.
Figure 4:
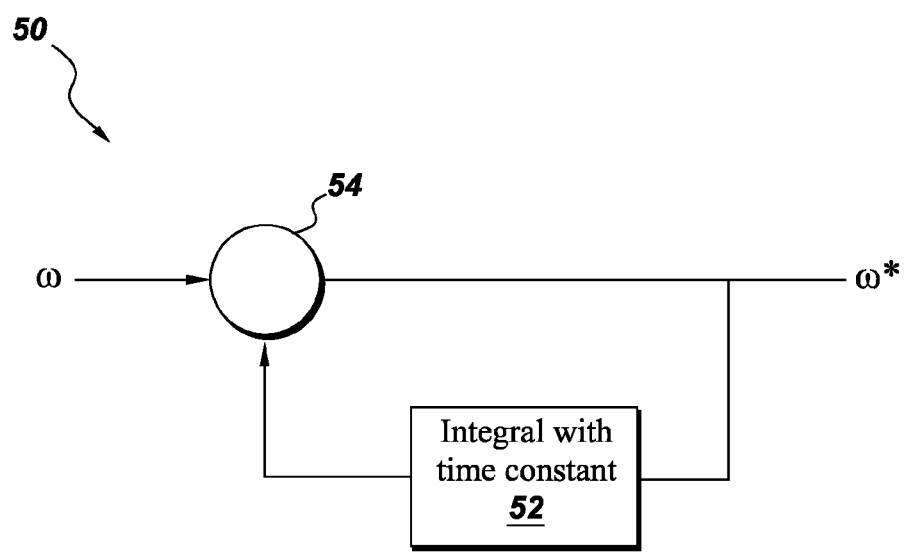

Internal reference frame element 26 provides an internal reference frequency of solar power generation system 10. The internal reference frequency may be obtained through any of a number of techniques with its accuracy varying by technique. Several examples are illustrated in FIGS. 3 and 4. FIG. 3 is an illustration of an element 46 to obtain the internal frequency from an integral of a comparison (from element 48) of a power command and a measured power signal. FIG. 4 is an illustration of a washout filter 50 comprising an integral with a time constant (element 52) in a closed loop feedback for comparison (via element 54) with the network frequency. In another embodiment which is less precise than either of the other two embodiments, a fixed internal reference frame element is used.

Referring back to FIG. 1, frequency comparator 28 compares the network frequency from frequency monitor 24 and the internal reference frequency from internal reference frame element 26. The comparison is then used by command signal generator 30 to determine whether a transient increase or decrease in commanded output power is warranted and to provide a command signal. The command signal comprises one or more command signals provided to power point tracker 22, to a converter or other interface associated with an optional energy storage unit 32, or to both. Control system 20 may comprise one or more software components, hardware components, or combinations thereof. Although certain aspects of control system 20 are emphasized herein with respect to embodiments of the present invention, control system 20 may additionally perform other control functions and is typically additionally coupled to a master controller 56 which in turn is typically coupled to a network controller 58 and may also be coupled to a plurality of local control systems 20.

Power point tracker 22 is used extract either maximum power available from PV module 14 or less than maximum power available from PV module 14. In embodiments with both DC to DC converter 12 and DC to AC converter 16, power point tracker 22 is used to control at least one of the DC to DC and DC to AC converters 12 and 16.

In one embodiment, an energy storage unit 32 may be used for supplying additional power when power from PV module 14 is insufficient to support the frequency stabilization. Energy storage unit 32 may comprise any type of unit that is capable of storing energy for later use on power line 36 with several examples including batteries, fuel cells, and flywheels. In one embodiment, energy storage unit 32 is coupled to power line 36 through an additional power converter 34. In this embodiment, control system 20 may further be configured for providing switching commands through command generator 30 to additional power converter 34 to extract additional energy from energy storage unit 32 when needed to support frequency stabilization of the power network. The system in this embodiment may further be configured for providing switching commands to additional power converter 34 to add energy to energy storage unit 32 through DC link 38 when needed to support frequency stabilization of power network 18 or when needed to recharge energy storage unit 32. The ability to use energy storage unit 32 to absorb power from power network 18 is useful for situations when power from PV module 14 cannot be decreased any further, such as during periods of darkness when PV module 14 is not producing power, and grid stabilization is still needed. To provide the flexibility for such absorption, in some embodiments control system 20 is configured to maintain status information regarding the level of charging of energy storage unit 32 and to avoid fully charging energy storage unit 32. How fully to charge or discharge energy storage unit 32 will depend upon specific factors of the environment in which energy storage unit 32 is to be used.

In a more specific embodiment for coupling of energy storage unit 32 to power generation system 10, additional power converter 34 comprises a DC to DC converter coupled to a DC link 38 between DC to DC converter 12 and the DC to AC converter 16. Energy storage unit 32 may be coupled at any desired location along power line 36, however, with the location dictating the type of converter to be used. In another embodiment (not shown), for example, additional power converter 34 may be coupled to power line 36 between PV module 14 and DC to DC converter 12. In still another embodiment, in a manner such as shown with respect to FIG. 2, the energy storage unit is coupled to power line 36 between the DC to AC converter and the power network.

Power point tracker 22 may be used to form the shape of the momentarily increased (or decreased) power delivered by the solar power generation system 10 above (or below) the nominal value during transient conditions for the purpose of damping frequency oscillations either with or without using energy stored in an energy storage unit. If energy storage is available and a power boost is needed, the power boost may come partially or entirely from the energy stored in energy storage unit 32. In embodiments without an energy storage unit, control system 20 of solar power generation system 10 is configured to, during normal operating conditions, operate power point tracker 22 in a curtailed mode, and, during transient unstable frequency conditions, increase or reduce the amount of output power to support frequency stabilization of power network 18 (in other words, to provide the transient power boost).

In one embodiment, command signal generator 30 is configured to provide a command signal to increase the commanded output power when the network frequency is less than the internal reference frequency by a first comparison limit. The selection of the first comparison limit will depend upon utility requirements for frequency matching. In one example, the first comparison limit is 0.2 Hz. In one embodiment, the commanded power boost may be shaped in a manner such as described in commonly assigned U.S. patent application Ser. No. 12/565,004, filed 23 Sep. 2009. If power generation system 10 is not operating in curtailment when a low power network frequency event occurs and sufficient energy is available in energy storage unit 32, no change in commands to DC to DC converter 12 or DC to AC converter 16 will be needed from power point tracker 22. In this case, control system 20 calls for all of the required energy from energy storage unit 32. Thus, in the power boost embodiment, the command signal may comprise one or more signals to power point tracker 22, energy storage unit 32, or both.

Command signal generator 30 may further be configured to provide a command signal to decrease the commanded output power when the internal reference frequency exceeds the network frequency by a second comparison limit. As with the first comparison limit, the selection of the second comparison limit will depend upon utility requirements for frequency matching. The second comparison limit may be, but need not be, the same magnitude as the first comparison limit. In this high-frequency power network (or power droop) embodiment, power point tracker 22 may be used to alter the power delivered to the grid as defined by the power shaper. This may be done by changing the gate signals to the switches of DC to DC converter 12 and/or DC to AC converter 16, or, if an energy storage unit 32 is used, by directing the excess power to the energy storage unit. For example, during high-frequency power network events, if energy storage unit 32 is coupled to power line 36 through a bidirectional converter, if desired, excess power from PV module 14 may be directed through DC link 38 to charge energy storage unit 32 so that no curtailment is required to enable the grid stabilization. Power from power network 18 may also or alternatively be used through DC link 38 to charge energy storage unit 32. Alternatively or additionally, energy storage unit 32 may be charged using sources of power other than the power generation system itself.

FIG. 2 is a block diagram of a solar power generation system 110 including a centralized energy storage unit 132 associated with a plurality of photovoltaic modules 14 in accordance with another embodiment. In this embodiment, energy storage unit 132 is coupled to an additional DC to AC converter 40, and a control system 120 is further configured for providing switching commands for additional DC to AC converter 40 to extract additional energy from energy storage unit 132 when needed to support frequency stabilization of the power network. As discussed above with respect to FIG. 1, DC to DC converters 12 are not required but are shown for purposes of example. Control system 120 may optionally be coupled to master controller 56 in a similar manner as control systems 20.

In accordance with one embodiment for operating the system of FIG. 1 or FIG. 2, a method of operating a solar power generation system 10 or 110 may comprise: using a power point tracker element 22 to extract either maximum power available from PV module 14 or less than maximum power available from PV module 14; obtaining a network frequency from power network 18; providing an internal reference frequency of the solar power generation system; comparing the network frequency and the internal reference frequency; and using the frequency comparison to determine whether a transient increase or decrease in commanded output power is warranted and to provide a command signal. As discussed above, in one embodiment energy may be extracted from and/or provided to an energy storage unit when needed to support frequency stabilization of the power network.

An advantage of the embodiments described herein is the enabling of solar power generation systems to meet utility needs for frequency stabilization and allow a greater penetration of solar generation on power networks.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A solar power generation system comprising:
   a DC to AC converter coupled to a photovoltaic (PV) module and for supplying power to a power network;
   a control system comprising:
      a power point tracker to extract either maximum power available from the PV module or less than maximum power available from the PV module;
      a frequency monitor to obtain a network frequency from the power network;
      an internal reference frame element to provide an internal reference frequency of the solar power generation system;
      a frequency comparator to compare the network frequency and the internal reference frequency; and
      a command signal generator to use the frequency comparison to determine whether a transient increase or decrease in commanded output power is warranted and to provide a command signal.

2. The solar power generation system of claim 1 wherein the DC to AC converter is coupled to the power network along a power line, wherein the solar power generation system further comprises an energy storage unit coupled to the power line through an additional power converter, and
wherein the control system is further configured for providing switching commands to the additional power converter to obtain energy from or supply energy to the energy storage unit when needed to support frequency stabilization of the power network.

3. The solar power generation system of claim 2 further comprising a DC to DC converter coupling the PV module to the DC to AC converter, and wherein the additional power converter comprises an additional DC to DC converter coupled to a DC link between the DC to DC converter and the DC to AC converter.

4. The solar power generation system of claim 1 further comprising an energy storage unit coupled to an additional DC to AC converter, wherein the control system is further configured for providing switching commands for the additional DC to AC converter to extract additional energy from the energy storage unit or provide energy to the energy storage unit when needed to support frequency stabilization of the power network.

5. The solar power generation system of claim 1 wherein the control system is configured to, during normal operating conditions, operate in a curtailed mode, and, during transient unstable frequency conditions, provide command signals from the command signal generator to the power point tracker to increase or reduce the amount of output power to support frequency stabilization of the power network.

6. The solar power generation system of claim 5 further comprising an energy storage unit for supplying additional power when power from the PV module is insufficient to support the frequency stabilization.

7. The solar power generation system of claim 1 wherein the internal reference frame element comprises an element to obtain an internal frequency from an integral of a comparison of a power command and a measured power signal, a washout filter, or a fixed internal reference frame element.

8. The solar power generation system of claim 1 wherein the command signal generator is configured to provide a command signal to increase the commanded output power when the network reference frequency is less than the internal reference frequency by a first comparison limit.

9. The solar power generation system of claim 8 wherein the command signal generator is configured to provide a command signal to decrease the commanded output power when the network frequency is greater than the internal reference frequency by a second comparison limit.

10. A solar power generation system comprising:
(a) a DC to AC converter for receiving power from a photovoltaic (PV) module and supplying power to a power network, wherein the DC to AC converter is coupled to the power network along a power line;
(b) an energy storage unit coupled to the power line through an additional power converter for supplying or absorbing energy when needed to support frequency stabilization of the power network;
(c) a control system comprising:
(i) a power point tracker to extract either (a) maximum power available from the PV module or (b) less than maximum power available from the PV module;
(ii) a frequency monitor to obtain a network frequency from the power network;
(iii) an internal reference frame element to provide an internal reference frequency of the solar power generation system;
(iv) a frequency comparator to compare the network frequency and the internal reference frequency; and
(v) a command signal generator to provide a command signal to adjust the commanded output power, the supply or absorption of energy by the energy storage unit, or both when the network frequency differs from the internal reference frequency by a comparison limit.

11. The solar power generation system of claim 10 further comprising a DC to DC converter coupling the PV module to the DC to AC converter, and wherein the additional power converter comprises an additional DC to DC converter coupled to a DC link between the DC to DC converter and the DC to AC converter.

12. The solar power generation system of claim 10 wherein the additional power converter comprises an additional DC to AC converter, and wherein the control system is further configured for providing switching commands for the additional DC to AC converter to extract additional energy from the energy storage unit or provide energy to the energy storage unit when needed to support frequency stabilization of the power network.

13. A method of operating a solar power generation system comprising, a photovoltaic (PV) module, a DC to AC converter coupled to the PV module and for supplying power to a power network, the method comprising:
using a power point tracker element to extract either maximum power available from the PV module or less than maximum power available from the PV module;
obtaining a network frequency from the power network;
providing an internal reference frequency of the solar power generation system;
comparing the network frequency and the internal reference frequency; and
using the frequency comparison to determine whether a transient increase or decrease in commanded output power is warranted and to provide a command signal.

14. The method of claim 13 further comprising extracting additional energy from an energy storage unit when needed to support frequency stabilization of the power network.

15. The method of claim 14 further comprising providing energy through a DC link of the power generation system to the energy storage unit when needed to support frequency stabilization of the power network or when needed to recharge the energy storage unit.

16. The method of claim 13 wherein controlling comprises, during normal operating conditions, operating the power generation system in a curtailed mode, and, during transient unstable frequency conditions, increasing or reducing the amount of output power from the power generation system to support frequency stabilization of the power network.

17. The method of claim 13 wherein providing the internal reference frequency comprises obtaining an internal frequency from an integral of a comparison of a power command and a measured power signal, a washout filter, or a fixed internal reference frame element.

18. The method of claim 13 wherein the commanded output power is increased when the network frequency is less than the internal reference frequency by a first comparison limit.

19. The method of claim 18 wherein the commanded output power is decreased when the network frequency is greater than the internal reference frequency by a second comparison limit.

* * * * *